(12) United States Patent
Thomas et al.

(10) Patent No.: US 11,818,166 B2
(45) Date of Patent: *Nov. 14, 2023

(54) MALWARE INFECTION PREDICTION AND PREVENTION

(71) Applicant: Malwarebytes Inc., Santa Clara, CA (US)

(72) Inventors: Sunil Mathew Thomas, Palm Harbor, FL (US); Tina LaVonne Barfield, Pinellas Park, FL (US); Adam Hyder, Cupertino, CA (US)

(73) Assignee: Malwarebytes Inc., Santa Clara, CA (US)

( * ) Notice: Subject to any disclaimer, the term of this patent is extended or adjusted under 35 U.S.C. 154(b) by 217 days.

This patent is subject to a terminal disclaimer.

(21) Appl. No.: 17/369,624

(22) Filed: Jul. 7, 2021

(65) Prior Publication Data

US 2022/0239670 A1 Jul. 28, 2022

Related U.S. Application Data

(63) Continuation of application No. 17/160,314, filed on Jan. 27, 2021, now Pat. No. 11,082,446.

(51) Int. Cl.
*H04L 9/40* (2022.01)
*G06N 5/04* (2023.01)
*G06N 20/00* (2019.01)

(52) U.S. Cl.
CPC ............. *H04L 63/145* (2013.01); *G06N 5/04* (2013.01); *G06N 20/00* (2019.01)

(58) Field of Classification Search
CPC ............... H04L 63/145; H04L 63/0227; H04L 63/0272; H04L 63/1441; G06N 5/04; G06N 20/00
See application file for complete search history.

(56) References Cited

U.S. PATENT DOCUMENTS

| | | | |
|---|---|---|---|
| 10,097,577 B2 | 10/2018 | Touboul et al. | |
| 2012/0144492 A1 | 6/2012 | Griffin et al. | |
| 2019/0005226 A1 | 1/2019 | Boutnaru | |
| 2019/0281078 A1* | 9/2019 | Eguiarte Salazar | .. H04L 63/162 |
| 2020/0274886 A1 | 8/2020 | Manadhata et al. | |
| 2020/0402063 A1 | 12/2020 | Tolpin | |
| 2020/0412743 A1 | 12/2020 | Angel et al. | |
| 2021/0021631 A1 | 1/2021 | Okutan et al. | |
| 2021/0090750 A1 | 3/2021 | Sadilek et al. | |
| 2022/0114593 A1* | 4/2022 | Johnson | ............ G06F 18/24133 |

\* cited by examiner

*Primary Examiner* — Beemnet W Dada
(74) *Attorney, Agent, or Firm* — Fenwick & West LLP

(57) ABSTRACT

A malware infection prediction method predicts a likelihood that a client device is to be infected with in a period of time based on state and behavior telemetry data. A malware infection prediction system receives telemetry data associated with use (i.e. behavior data) and configuration (i.e. state data) of a client device. By using a trained model, the system predicts a likelihood of the client device becoming infected within a given time frame. Based on the predicted likelihood, the system generates recommendations including recommended actions for reducing the likelihood of the client device becoming infected. The system then generates notifications including the recommendations and sends the notifications to the client device or to an administrative account associated with the client device.

20 Claims, 4 Drawing Sheets

MALWARE INFECTION PREDICTION AND PREVENTION

CROSS REFERENCE TO RELATED APPLICATIONS

This application is a continuation of co-pending U.S. application Ser. No. 17/160,314, filed on Jan. 27, 2021, which is incorporated by reference.

FIELD OF ART

The present disclosure generally relates to computer security and more specifically to malware infection prediction and prevention.

BACKGROUND

A computing device may be infected by malware due to various factors, such as the configuration state of the computing device or user behaviors associated with use of the computing device. To minimize the risk of malware infection, it is advantageous to predict malware infection before the computing device becomes infected.

SUMMARY

A malware infection prediction method predicts a likelihood that a client device is to be infected within a period of time based on state and behavior telemetry data. A malware infection prediction system receives telemetry data associated with use (i.e. behavior data) and configuration (i.e. state data) of a client device. By using a trained model, the system predicts a likelihood of the client device becoming infected within a given time frame. Based on the predicted likelihood, the system generates recommendations including recommended actions for reducing the likelihood of the client device becoming infected. The system then generates notifications including the recommendations and sends the notifications to the client device or to an administrative account associated with the client device.

In another embodiment, a non-transitory computer-readable storage medium stores instructions that when executed by a processor causes the processor to execute the above-described method.

In yet another embodiment, a computer system includes a processor and a non-transitory computer-readable storage medium that stores instructions for executing the above-described method.

BRIEF DESCRIPTION OF THE DRAWINGS

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
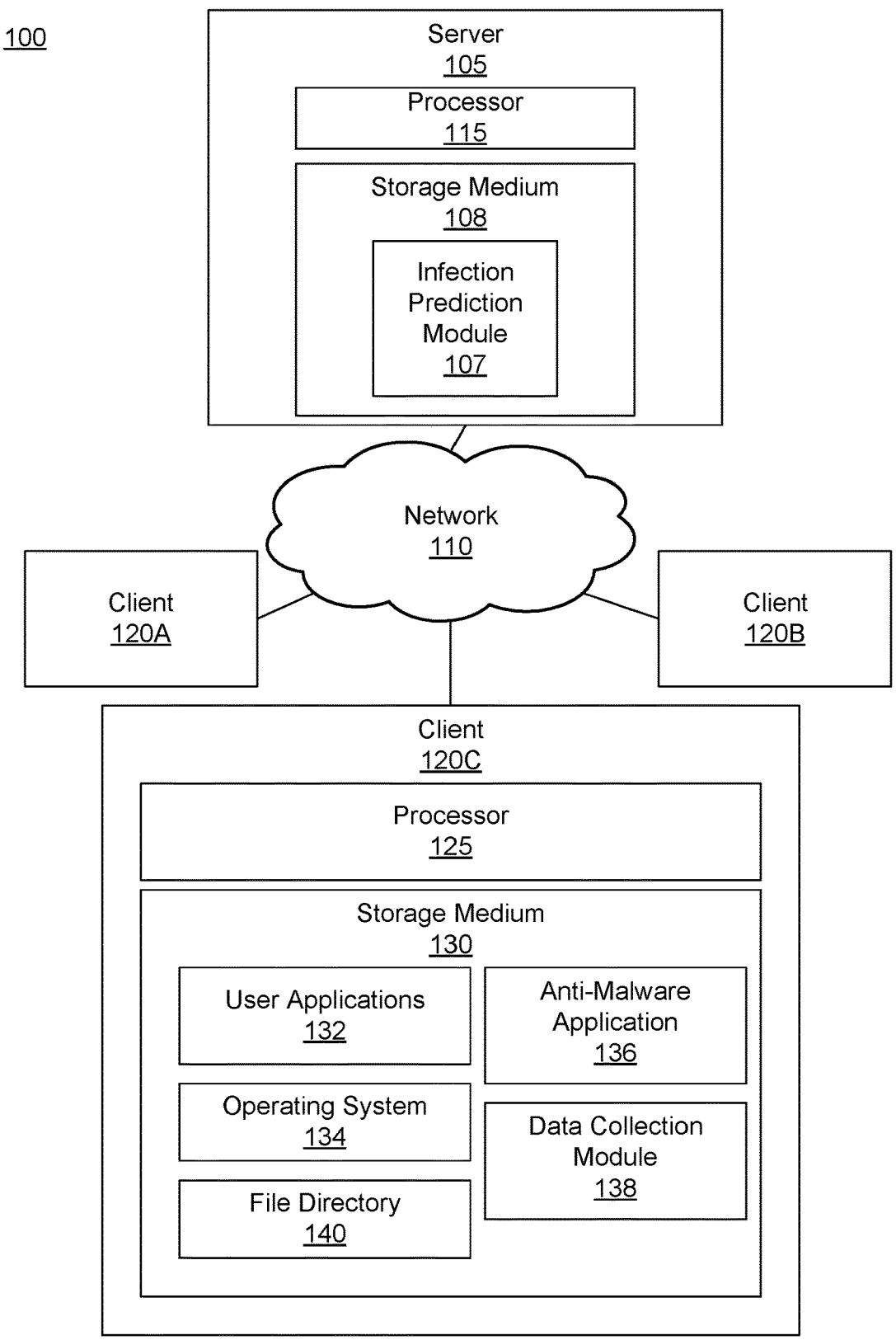
FIG. 1 is a system diagram illustrating an example embodiment of a computing environment including clients, a server, and a network.

FIG. 1 is a system diagram illustrating an example embodiment of a system environment 100 comprising a server 105, a network 110, and clients 120A, 120B and 120C, which are collectively referenced herein as clients 120. For simplicity and clarity, only one server 105 and a limited number of clients 120 are shown. However, other embodiments may include different numbers of servers 105 and clients 120. The system environment 100 may also include different or additional entities.

The network 110 represents the communication pathways between the server 105 and clients 120. In one embodiment, the network 110 is the Internet. The network 110 may also utilize dedicated or private communications links that are not necessarily part of the Internet such as local area networks (LAN). In one embodiment, the network 110 uses standard communications technologies and/or protocols.

Each client 120 comprises one or more computing devices capable of processing data as well as transmitting and receiving data via the network 110. For example, a client device 120 may be a desktop computer, a laptop computer, a smart phone, a tablet computing device, an Internet of Things (IoT) device, or any other device having computing and data communication capabilities. Each client 120 includes a processor 125 for manipulating and processing data, and a storage medium 130 for storing data and program instructions associated with various applications. The storage medium 130 may include both volatile memory (e.g., random access memory) and non-volatile storage memory such as hard disks, flash memory, flash drives, external memory storage devices, USB drives, and the like. In addition to storing program instructions, the storage medium 130 stores various data associated with operation of the client device 120.

In one embodiment, the storage medium 130 comprises a non-transitory computer-readable storage medium that stores a file directory 140 and various executable programs including an operating system 134, anti-malware application 136, user applications 132, and a data collection module 138 that are each embodied as computer-executable instructions stored to the non-transitory computer-readable storage medium. The instructions, when executed by the processor 125, cause the clients 120 to perform the functions attributed to the programs described herein.

The operating system 134 is a specialized program that manages computer hardware resources of the clients 120 and provides common services to the user applications 132. For example, a computer's operating system 134 may manage the processor 125, storage medium 130, or other components not illustrated such as a graphics adapter, an audio adapter, network connections, disc drives, and USB slots. A cell phone's operating system 134 may manage the processor 125, storage medium 130, display screen, keypad, dialer, wireless network connections and the like. Because many programs and executing processes compete for the limited resources provided by the processor 125, the operating system 134 may manage the processor bandwidth and timing to each requesting process. Examples of operating systems 134 include WINDOWS, MAC OS, IOS, LINUX, UBUNTU, UNIX, and ANDROID.

The user applications 132 may include applications for performing a particular set of functions, tasks, or activities for the benefit of the user. Examples of user applications 132 may include a word processor, a spreadsheet application, and a web browser. In some cases, a user application 132 may be a source of malware that is unknowingly hidden in the user application 132. The malware may infect the client 120 when the user application 132 is installed or executed.

The file directory 140 stores files. Files may include system files associated with operation of the operating system 134, the user applications 132, or the anti-malware application 136. The files may further include user files that may be created or modified by users. Examples of user files may include image files, video files, word processor documents, spreadsheet documents, and drawing files.

An anti-malware application 136 detects, stops, and removes malware. The anti-malware application 136 may prevent new malware from being installed on a client 120 or remove or disable existing malware that is already present on the client 120. The anti-malware application 136 may determine if a process is malware based on behaviors indicative of malware, based on static analysis of a file, based on emulation of a program using a sandbox, or based on a combination of factors. In one embodiment, the anti-malware application 136 may store and/or download from the network 110, malware definitions that specify characteristics or behaviors of malware that the anti-malware application 136 seeks to detect. The anti-malware application 136 may also extract and send data to the server 105 for classification instead of performing detection locally. The server 105 may receive the data, perform analysis and classification and send data and instructions back to the anti-malware application 136 to enable the client 120 to identify and stop malicious activities.

A data collection module 138 collects information from the client 120 relating to user interactions with the client 120 and transmits relevant data to the server 105. The data collection module 138 may collect both state and behavior information from each end-user device. State information corresponds to static data associated with a client device 120 and may represent a snapshot of the configuration of the client 120 at the time when the information is collected. For example, state information may include identification of software installed on the client 120, versions of the software installed, a hardware configuration, an operating system configuration, a security configuration, a network configuration, a firewall configuration, etc. Behavior information corresponds to information associated with user interactions with the client 120 and may cause changes in state. For example, behavior information may include internet usage behavior (e.g. webpages that a user frequently browses) use of firewall, use of anti-malware applications, use of secure domain name system (DNS), frequency that a user installs software updates, files that a user frequently accesses, file downloading activities, etc. The data collection module 138 may also collect information indicating detected malware infections at the time when data is collected. The data collection module 138 transmits the collected data to an infection prediction module 107 of the server 105 for malware infection prediction, which is discussed in further detail in accordance with FIG. 2.

The data collection module 138 may also collect timestamps and time frame information associated with the state and behavior information, such as the timestamps when the state information is collected and the time period associated with the collected behavior information.

The server 105 is a computer system configured to store, receive, and transmit data to client devices 120 via the network 110. The server 105 may include a singular computing system, such as a single computer, or a network of computing systems, such as a data center or a distributed computing system. In one embodiment, the server 105 includes a processor 115 for manipulating and processing data, and a storage medium 108 for storing data and program instructions associated with various applications. The storage medium 108 may include both volatile memory (e.g., random access memory) and non-volatile storage memory such as hard disks, flash memory, flash drives, external memory storage devices, USB drives, and the like. The server 105 may receive data from the clients 120 and may also send data to the clients.

The storage medium 108 includes an infection prediction module 107. The infection prediction module 107 predicts a likelihood of the client 120 becoming infected by malware at future time based on a machine-learned prediction model and the current and historical state and behavior information from the client 120. The infection prediction module 107 is discussed in further detail in FIG. 2 below.

Figure 2:
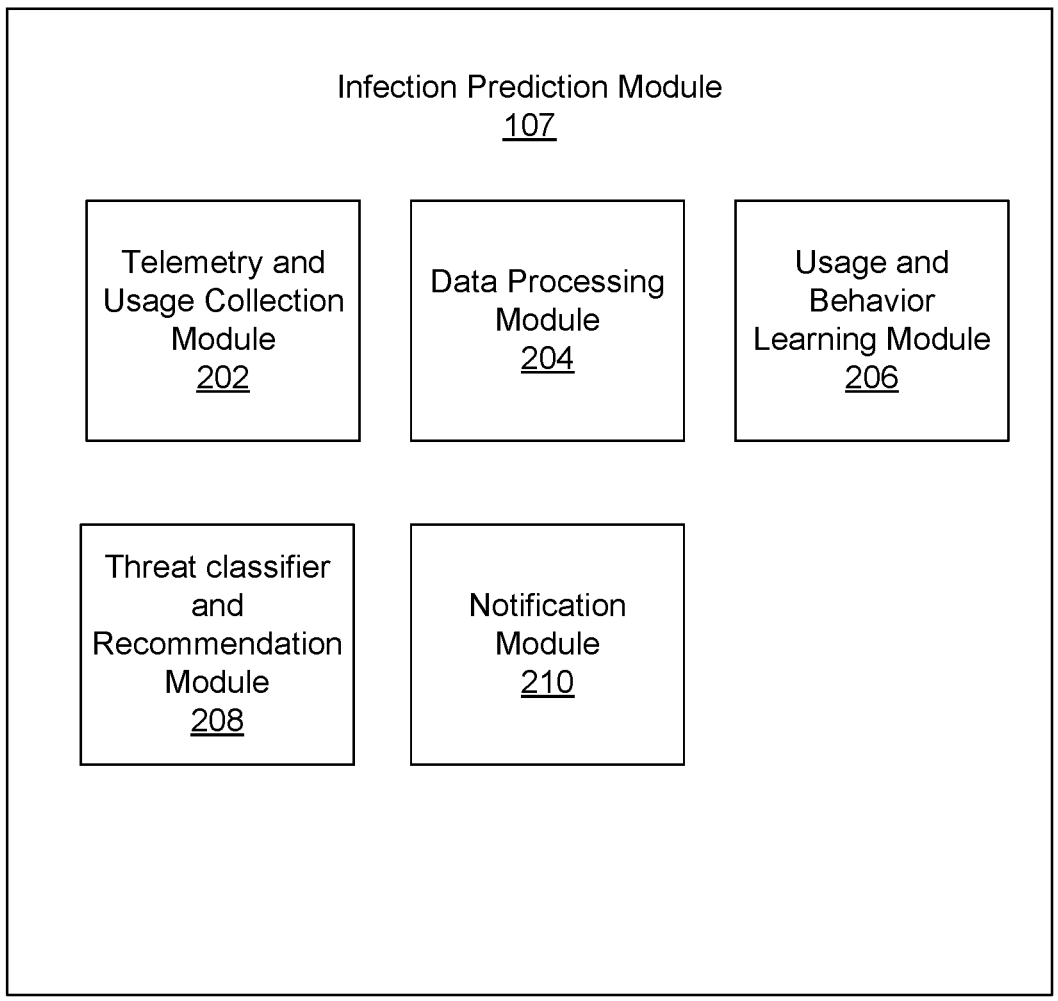
FIG. 2 is a block diagram illustrating an example embodiment of an infection prediction module of the server.

FIG. 2 illustrates an example embodiment of infection prediction module 107 of the server 105. The infection prediction module 107 includes a telemetry and usage collection module 202, a data processing module 204, a usage and behavior learning module 206, a threat classifier and recommendation module 208, and a notification module 210. Alternative embodiments may include different or additional modules or omit one or more of the illustrated modules.

The telemetry and usage collection module 202 collects state and behavior data from one or multiple client devices such as clients 120A-C illustrated in FIG. 1. The telemetry and usage collection module 202 may collect data from the data collection module 138 located on end-user devices. The collected data include state and behavior data, where the state data is associated with configuration of a client device 120 and behavior data is associated with user interactions with the client 120.

The telemetry and usage collection module 202 also collects timestamps and time frame information associated with the state and behavior from the data collection module 138. The telemetry and usage collection module 202 may also collect information regarding if a client 120 is infected with malware at the time when the data is collected. The telemetry and usage collection module 202 transmits the collected data to data processing module 204 for further processing.

The data processing module 204 processes data received from the telemetry and usage collection module 202. In one embodiment, the data processing module 204 may aggregate data received from the telemetry and usage collection module 202 from multiple client devices 120. The aggregated data may be further cleaned and validated through various steps such as detecting errors, eliminating invalid records, and filling in missing values. The data may be further organized into an indexable format for querying, analysis, and manipulation purposes. The data processing module 204 may store the data in a database or in a cloud-based platform.

The usage and behavior learning module 206 analyzes state and behavior data and predicts a likelihood that a client 120 will become infected by malware in a given future timeframe by applying a machine-learned model. The machine-learned model may be a supervised or unsupervised model that is trained with an aggregated dataset comprising telemetry data from multiple client devices 120. A supervised machine learned model may utilize techniques such as linear regression, logistic regression, support vector machine (SVM), random forest, or neural networks. Here, feature vectors may be generated that each represents the state and behavior data associated with a particular client device 120 at a particular time, based on the timestamps or time ranges associated with the collected data. The feature vectors have labels indicating whether or not the client device 120 became infected by malware within a predefined time period from the time point associated with the feature vector. The supervised machine-learned model is trained to learn the correlations between data sets obtained from different clients at different times (as represented by the feature vectors) and whether or not those clients 120 subsequently become infected within some limited time period.

In another embodiment, an unsupervised machine learning model may be used. Here, the training data is not labeled, and the model does not depend on whether or not subsequent infections were actually detected. Instead, the model uses unsupervised machine learning techniques such as clustering to identify clusters of similar feature vectors with common characteristics. The unsupervised model may identify outliers that lie an abnormal distance (e.g. above a threshold distance) from the majority of clusters. The outliers represent data from client device 120 having abnormal characteristics and may be identified as having greater probabilities of getting infected by malware.

The usage and behavior learning module 206 may apply a machine-learned model to predict a likelihood that a target client device 120 will become infected by malware within a given timeframe. Here, a feature vector is generated from the collected data associated with a client 120 and the feature vector is inputted to the trained machine-learned model. The machine-learned model then generates a likelihood that the target client device 120 will become infected by malware during the predefined time period.

In an embodiment, the model may generate prediction results representing likelihoods of infection at one or more different future specified times such as a time of the day, a day of the month, or a month of the year. In another embodiment, the model may generate a prediction indicating a particular time or time period when a target client device 120 is most likely to become infected by malware. For example, a user who uses a client device 120 more often over weekends may result in a higher likelihood that the client device 120 gets infected over weekends. In another example, a client device 120 may be used to check a large number of emails in the morning may be more likely to get infected during that period of time of the day.

The usage and behavior learning module 206 may also produce analytical data based on the predicted likelihood. For example, the usage and behavior learning module 206 may generate health scores based on the predicted likelihood. The health score may be in a numerical scale (such as "90 out of 100") or in a letter scale (such as "A" and "B") where a health score "A" may correspond to an infection probability that is under 15%. The usage and behavior learning module 206 may also generate predictions indicating the types of potential malware that the target client device may be infected with and generate likelihoods associated with the various types of potential malware infection. For example, a model may generate different likelihoods associated with a virus, worm, spyware, ransomware, bots, etc.

In one embodiment the usage and behavior learning module 206 may continuously train and update the machine-learned models, as will be discussed in further detail below with respect to FIG. 3.

The threat classifier and recommendation module 208 may identify and classify potential risks and generate recommendations based on the predictions from the usage and behavior learning module 206. The threat classifier and recommendation module 208 may perform identify sources of potential attacks. For example, the threat classifier and recommendation module 208 may identify that certain websites may be associated with higher infection likelihood based on trends identified in the collected data. Based on the identified potential risks, the threat classifier and recommendation module 208 generates recommendations including suggested actions that reduce the infection likelihood. Some examples of recommendations may include enabling a firewall, enabling a virtual private network (VPN), updating software, updating a hardware configuration, scanning a device that connects to the client device, changing configuration settings, changing security settings, or changing network settings.

In one embodiment, the threat classifier and recommendation module 208 may also generate general recommendations to multiple client devices 120 based on analysis from the usage and behavior learning module 206. For example, the threat classifier and recommendation module 208 may determine that a type of popular malware is spreading among client devices 120 based on outputs from the usage and behavior learning module 206 and therefore may generate recommended actions for one or more client devices 120 that are at potential risk of exposure to the popular malware.

The threat classifier and recommendation module 208 may be configured to limit the number of recommendations sent within a period of time to below a threshold number in order to avoid fatiguing users with an overwhelming number of recommendations. For example, the threat classifier and recommendation module 208 may identify recommendations that are associated with the highest reduction in infection likelihood and generate only the identified recommendations.

The notification module 210 may send the notifications generated from the threat classifier and recommendation module 208 to client device 120 for a user to take appropriate actions. The notification module 210 may also send the notifications to a central cloud console for an IT administrator or security administrator to remotely take appropriate actions. In other embodiments, the notification module 210 may send the notification to the anti-malware application 136 to enable the anti-malware application 136 to automatically initiate the recommended action without user intervention. For example, the anti-malware application 136 may automatically update configuration settings that have been deemed likely to reduce the risk of infection in response to the notifications.

Figure 3:
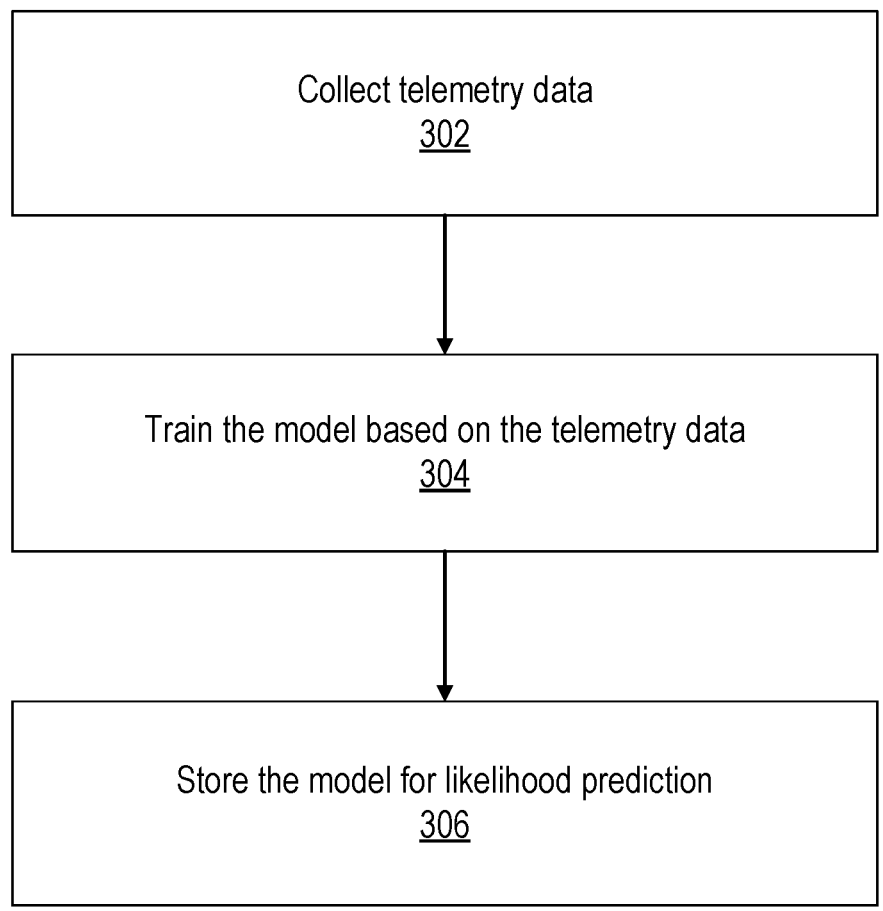
FIG. 3 is a flowchart illustrating an embodiment of a process for training a prediction model for predicting malware infection.

FIG. 3 is a flow chart illustrating an embodiment of a process for training the machine-learned model. The process may be performed either offline based on a set of training data, or online using real-time data collected from the clients 120. In this manner, the usage and behavior learning module 206 may continuously train and update the machine-learned model with updated telemetry data. The telemetry and usage collection module 202 may collect 302 the telemetry data (e.g., from a training set or from the client devices 120). The data includes timestamped behavior and state information and includes timestamped indications of whether the target client device 120 is infected or not. The data may be processed through the data processing module 204 and passed on to the usage and behavior learning module 206, where the model may be trained 304 based on the received data using supervised or unsupervised learning techniques, to generate a model that can predict a likelihood of a target client 120 becoming infected at a future time based on telemetry data representing current and historical behavior and state information. The model includes model parameters that may be stored 306 for future likelihood prediction. As additional telemetry data and infections are detected, the model may be retrained at various intervals.

Figure 4:
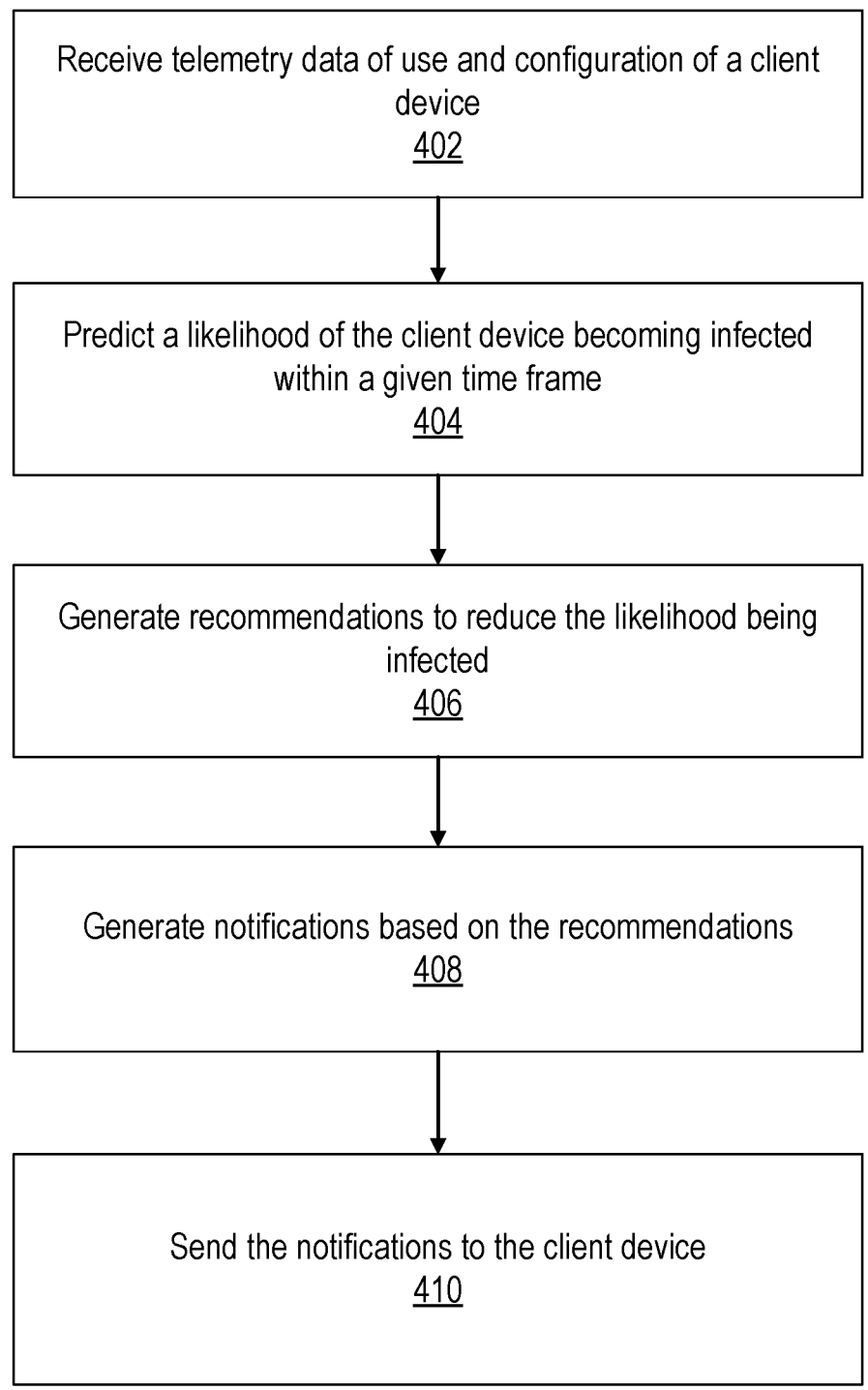
FIG. 4 is a flowchart illustrating an embodiment of a process for predicting malware infection.

FIG. 4 is a flowchart illustrating an embodiment of a process for predicting a likelihood that a client device 120 will become infected by malware within a given timeframe. The telemetry and usage collection module 202 receives 402 telemetry data associated with use (i.e. behavior) and configuration (i.e. state) of a client device 120. The usage and behavior learning module 206 predicts 404 a likelihood of the client device 120 becoming infected by malware within a given time frame (e.g. within a day, a week, a month, etc.) based on application of a machine-learned model to the telemetry data. The threat classifier and recommendation module 208 generates 406 recommendations including actions to be performed that are predicted to reduce the likelihood being infected. The notification module 210 generates 408 notifications based on the recommendations and sends 410 the notifications to the client device 120. The telemetry and usage collection module 202 may subsequently receive updated data from the client 120 indicating if the client 120 was infected by malware within the given time frame and send the data to the usage and behavior learning module 206, where the model is trained and updated with updated data.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for preventing malware infection comprising:
   receiving, at a server, telemetry data associated with use and configuration of a client device, wherein the telemetry data comprise:
      user behavior data regarding interactions of one or more users of the client device; and
      configuration data indicating a current configuration of the client device, the configuration data including at least one of: installed software, software configuration, hardware configuration, security configuration, and network configuration;
   predicting a likelihood of the client device becoming infected within a given time frame by applying a trained model to the telemetry data;
   generating, based on the likelihood of the client device becoming infected, one or more recommended actions for reducing the likelihood of the client device becoming infected;
   generating one or more notifications including the recommendations; and
   sending the notifications to the client device.

2. The method of claim 1, wherein the model was trained using an aggregated telemetry dataset including telemetry data of a plurality of client devices.

3. The method of claim 1, wherein the trained model predicts the likelihood of the client device becoming infected based on at least one of: a time of a day, a time of a month, or a time of a year.

4. The method of claim 1, wherein the trained model further predicts one or more types of malware that are associated with the likelihood of the client device becoming infected.

5. The method of claim 1, wherein the trained model is a machine learning model trained using supervised learning or unsupervised learning.

6. The method of claim 1, wherein the user behavior data includes timestamps indicating times at which the user interactions with the client device occurred.

7. The method of claim 1, wherein the recommended actions include at least one of: enabling a firewall, enabling a virtual private network (VPN), updating software, scanning a device that connects to the client device, changing security settings, or changing network settings.

8. A non-transitory computer readable storage medium storing instructions for preventing malware infection, the instructions when executed by one or more processors causing the one or more processors to perform steps comprising:
    receiving, at a server, telemetry data associated with use and configuration of a client device, wherein the telemetry data comprise:
        user behavior data regarding interactions of one or more users of the client device; and
        configuration data indicating a current configuration of the client device, the configuration data including at least one of: installed software, software configuration, hardware configuration, security configuration, and network configuration;
    predicting a likelihood of the client device becoming infected within a given time frame by applying a trained model to the telemetry data;
    generating, based on the likelihood of the client device becoming infected, one or more recommended actions for reducing the likelihood of the client device becoming infected;
    detecting an infection result indicating whether or not the client device became infected within the given time frame;
    retraining the trained model based on the telemetry data and the infection result; and
    storing the retrained model for future predictions.

9. The non-transitory computer readable storage medium of claim 8, wherein the model is trained using an aggregated telemetry dataset including telemetry data of a plurality of client devices.

10. The non-transitory computer readable storage medium of claim 8, wherein the trained model predicts the likelihood of the client device becoming infected based on at least one of: a time of a day, a time of a month, or a time of a year.

11. The non-transitory computer readable storage medium of claim 8, wherein the trained model further predicts one or more types of malware that are associated with the likelihood of the client device becoming infected.

12. A non-transitory computer readable storage medium storing instructions for preventing malware infection, the instructions when executed by one or more processors causing the one or more processors to perform steps comprising:
    receiving, at a server, telemetry data associated with use and configuration of a client device, wherein the telemetry data comprise:
        user behavior data regarding interactions of one or more users of the client device; and
        configuration data indicating a current configuration of the client device, the configuration data including at least one of: installed software, software configuration, hardware configuration, security configuration, and network configuration;
    predicting a likelihood of the client device becoming infected within a given time frame by applying a trained model to the telemetry data;
    generating, based on the likelihood of the client device becoming infected, one or more recommended actions for reducing the likelihood of the client device becoming infected;
    generating one or more notifications including the recommendations; and
    sending the notifications to the client device.

13. The non-transitory computer readable storage medium of claim 12, wherein the model is trained using an aggregated telemetry dataset including telemetry data of a plurality of client devices.

14. The non-transitory computer readable storage medium of claim 12, wherein the trained model predicts the likelihood of the client device becoming infected based on at least one of: a time of a day, a time of a month, or a time of a year.

15. The non-transitory computer readable storage medium of claim 12, wherein the trained model further predicts one or more types of malware that are associated with the likelihood of the client device becoming infected.

16. The non-transitory computer readable storage medium of claim 12, wherein the user behavior data includes timestamps indicating times at which the user interactions with the client device occurred.

17. The non-transitory computer readable storage medium of claim 12, wherein the recommended actions include at least one of: enabling a firewall, enabling a virtual private network (VPN), updating software, scanning a device that connects to the client device, changing security settings, or changing network settings.

18. The non-transitory computer readable storage medium of claim 8, wherein the trained model is a machine learning model trained using supervised learning or unsupervised learning.

19. The non-transitory computer readable storage medium of claim 8, wherein the user behavior data includes timestamps indicating times at which the user interactions with the client device occurred.

20. The non-transitory computer readable storage medium of claim 8, wherein the recommended actions include at least one of: enabling a firewall, enabling a virtual private network (VPN), updating software, scanning a device that connects to the client device, changing security settings, or changing network settings.

* * * * *